United States Patent
Justice

(10) Patent No.: US 6,846,144 B2
(45) Date of Patent: Jan. 25, 2005

(54) SELF-PROPELLED LOAD-BEARING MOVEMENT APPARATUS

(76) Inventor: Jerry V. Justice, 1902 McCord La., Milton, KY (US) 40045-1521

( * ) Notice: Subject to any disclaimer, the term of this patent is extended or adjusted under 35 U.S.C. 154(b) by 54 days.

(21) Appl. No.: 10/251,421

(22) Filed: Sep. 20, 2002

(65) Prior Publication Data

US 2003/0059282 A1 Mar. 27, 2003

Related U.S. Application Data

(60) Provisional application No. 60/324,213, filed on Sep. 21, 2001.

(51) Int. Cl.⁷ .............................. E04G 21/14; F41A 9/00
(52) U.S. Cl. .......................................... 414/12; 414/589
(58) Field of Search ........................ 414/12, 589, 590; 180/6.48, 254, 411; 230/91.1, 149.2, 656

(56) References Cited

U.S. PATENT DOCUMENTS

| | | |
|---|---|---|
| 2,472,932 A | 6/1949 | Adkins |
| 2,974,972 A | 3/1961 | Hassell |
| 3,236,400 A | 2/1966 | Turturro et al. |
| 3,533,641 A | 10/1970 | Driskill |
| 3,887,204 A | 6/1975 | Austin |
| 5,012,879 A | 5/1991 | Bienek et al. |
| 5,151,004 A * | 9/1992 | Johnson ...................... 414/495 |
| 6,027,295 A | 2/2000 | Geppert et al. |
| 6,071,062 A | 6/2000 | Warhurst et al. |
| 6,129,495 A * | 10/2000 | Marshall ...................... 414/12 |
| 6,155,770 A | 12/2000 | Warhurst |

* cited by examiner

Primary Examiner—Gene O. Crawford
(74) Attorney, Agent, or Firm—Barnes & Thornburg

(57) ABSTRACT

An apparatus for the movement of mobile homes, sectional homes, and manufactured homes is disclosed. The apparatus is self-propelled by a drive mechanism and a hydraulic system. The apparatus facilitates the horizontal and vertical movement of the home during transportation, relocation, and service of the home.

18 Claims, 22 Drawing Sheets

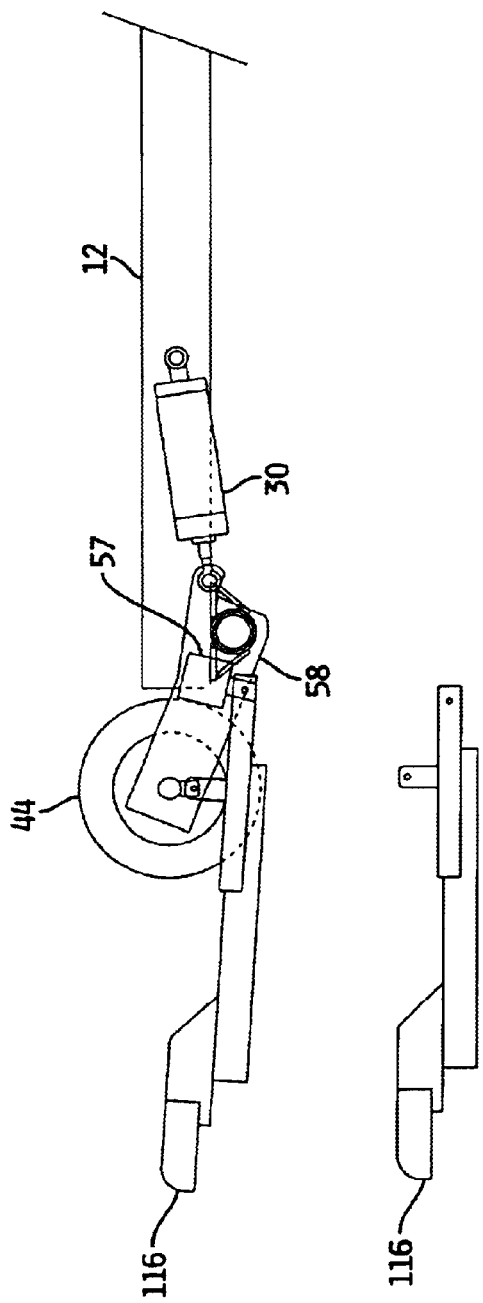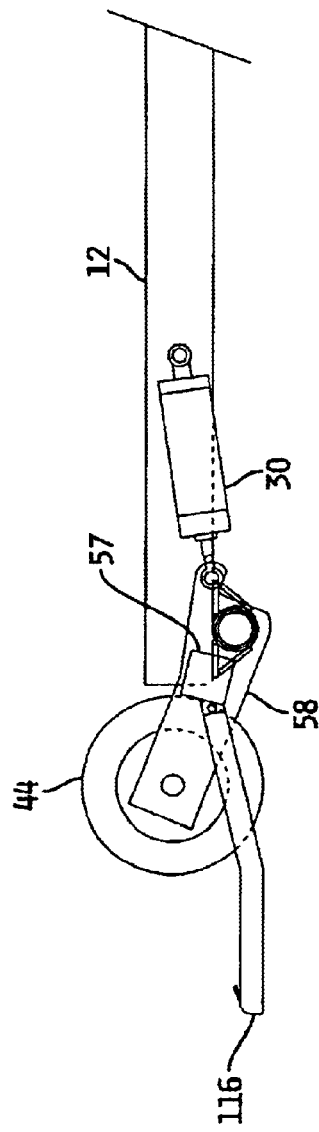
FIG. 12A
FIG. 12B

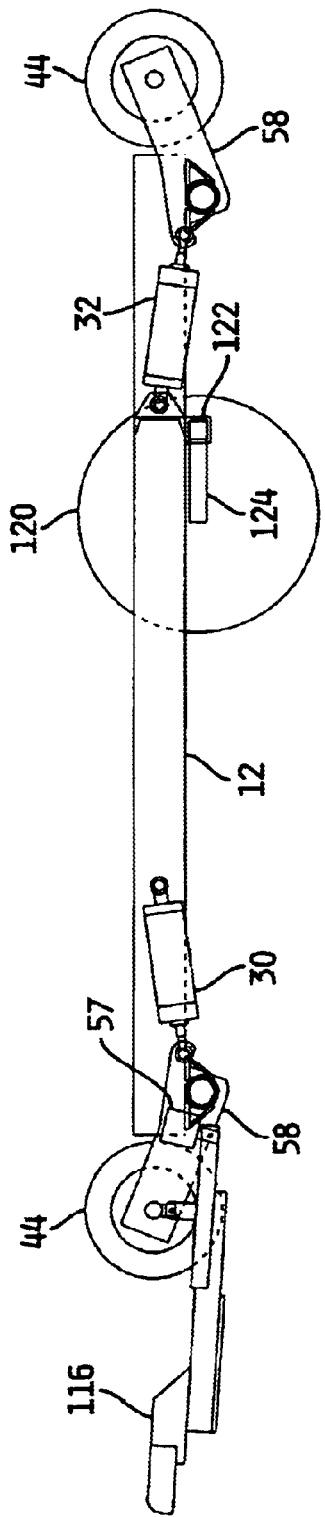
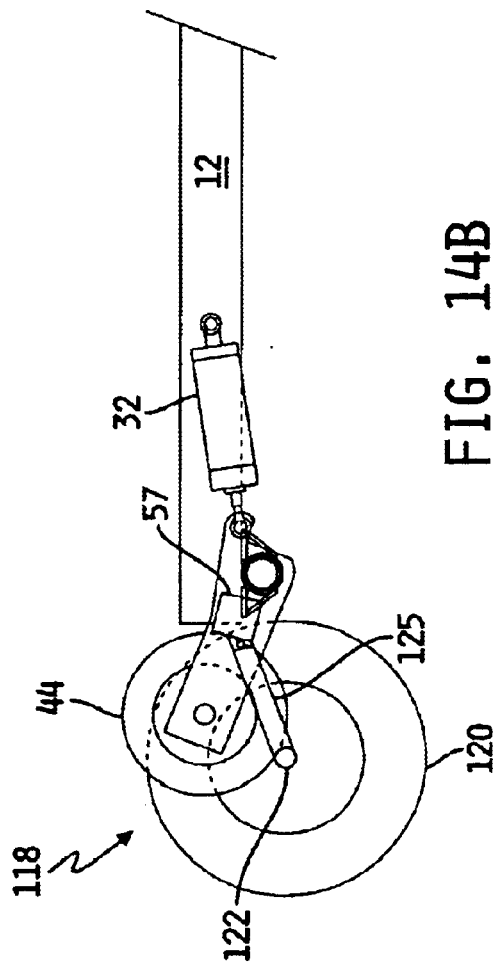
FIG. 14A
FIG. 14B

SELF-PROPELLED LOAD-BEARING MOVEMENT APPARATUS

This application claims the benefit of U.S. provisional application Ser. No. 60/324,213 filed Sep. 21, 2001.

TECHNICAL FIELD OF THE DISCLOSURE

The present disclosure generally relates to a self-propelled apparatus for use in the movement of loads. In particular, the present disclosure relates to an apparatus for use in the movement of mobile and sectional homes.

BACKGROUND OF THE DISCLOSURE

Mobile and sectional homes are generally constructed remotely from the location where the home will be used. Once a home is constructed it is moved to its final location. Additionally, mobile and sectional homes may be moved multiple times during the life of the home. Accordingly, the homes are constructed with a frame structure that rests upon two or more steel I-beams that run the length of the home. The I-beams facilitate the movement of the home from one location to another. Wheels may be permanently attached to the I-beams providing the home with a mode of movement. Conversely, some mobile and sectional homes do not have wheels attached to the I-beams and must be loaded on a trailer that attaches to the I-beams and includes wheels to support the movement of the home.

Moving and relocating mobile and sectional homes is difficult. The long length of the home makes maneuvering around obstacles and performing sharp radius turns arduous. Current methods of performing sharp radius turns are laborious and include multiple realignment of the home or trailer by the transporting vehicle or winching the rear of the home or trailer across multiple sheets of soaped plywood. Once the home is relocated to the new site, the home is positioned into its assigned spot. Positioning the home into the correct location is also arduous due to its size and difficulty in controlling the rear of the home or trailer. Additionally, during the transportation of the home, the weight of the home may cause one or more tires to blow. Changing blown tires on the mobile home or trailer on a roadway can be dangerous and difficult due to the size of the home or trailer. Multiple jacks and blocks are often required to facilitate the changing of tires.

Similar difficulties are experienced when relocating a mobile or sectional home from one location to another. These difficulties are experienced in maneuvering and preparing the home for transportation, maneuvering the home during transportation, and repositioning the home at the new location. Accordingly, an apparatus to improve the maneuverability of a mobile or sectional home during loading, unloading, and transportation is desired.

SUMMARY OF THE DISCLOSURE

In accordance with one illustrative embodiment, an apparatus for moving a first end of a mobile home circumferentially around a second end of the mobile home is provided. The apparatus includes a frame and a gas engine mounted to the frame. The apparatus also includes a hydraulic pump coupled to the gas engine and mounted to the frame. A plurality of hydraulic valves are coupled to the hydraulic pumps. A plurality of hydraulic cylinders are coupled to and controlled by the hydraulic valves and have a first end coupled to the frame. A first and second set of movable wheels are coupled to the frame and to a second end of the hydraulic cylinders. A plurality of drive motors are coupled to the frame and are controlled by the hydraulic valves. The drive motors control the movable wheels.

In accordance with another illustrative embodiment, a platform for relocating a mobile home from a first position to a second position is provided. The apparatus includes a frame and a drive mechanism mounted to the frame. The apparatus also includes a hydraulic pump coupled to the drive mechanism and mounted to the frame. A plurality of hydraulic valves are coupled to the hydraulic pumps. A plurality of actuators are controlled by the hydraulic valves and have a first end coupled to the frame. A plurality of movable wheels are coupled to the frame and to a second end of the actuators. A plurality of drive motors are coupled to the frame and are controlled by the hydraulic valves. The drive motors control the movable wheels.

In accordance with an additional illustrative embodiment, an apparatus for moving a load from a first position to a second position is provided. The apparatus includes a frame couplable to the load. The apparatus also includes a drive mechanism mounted to the frame. A plurality of movable wheels are coupled to the frame. A plurality of drive motors are coupled to the frame and control the movable wheels. A hydraulic system is coupled to the frame and receives power from the gas engine. The hydraulic system controls the actuation of the drive motors.

In accordance with yet another illustrative embodiment, an apparatus for moving a load is disclosed. The apparatus includes a frame and a drive mechanism mechanically coupled to the frame. The apparatus also includes a strut mechanically coupled to the frame such that the strut is movable relative to the frame between a first position and a second position. The strut is operatively coupled the drive mechanism such that the drive mechanism moves the strut between the first position and the second position. The apparatus further includes a wheel rotatably coupled to the strut and operatively coupled to the drive mechanism such that the drive mechanism rotates said wheel relative to the strut.

In accordance with a further illustrative embodiment, a method for moving a load is disclosed. The method includes coupling the load to a frame and raising the load from a first elevation to a second elevation by lowering a wheel mechanism that is mechanically coupled to the frame. Additionally, the method comprises engaging the wheel mechanism with a drive mechanism such that a wheel, which is coupled to the wheel mechanism, rotates and causes the load to move from a first position to a second position. The method further includes lowering the load from the second elevation to the first elevation by raising the wheel mechanism.

BRIEF DESCRIPTION OF THE DRAWINGS

The detailed description particularly refers to the accompanying figures in which:

FIG. 1b is a top elevational view of another mobile home movement apparatus similar to FIG. 1a;

FIG. 12a is a side perspective view of a ball hitch assembly attached to the apparatus of FIG. 1;

FIG. 12b is a side perspective view of a ball hitch assembly attached to the apparatus of FIG. 1;

FIG. 14a is a side perspective view of a transport dolly attached to a central portion of the apparatus of FIG. 1;

FIG. 14b is a side perspective view of a transport dolly attached towards an end portion of the apparatus of FIG. 1;

DETAILED DESCRIPTION OF THE DISCLOSURE

Figure 1A:
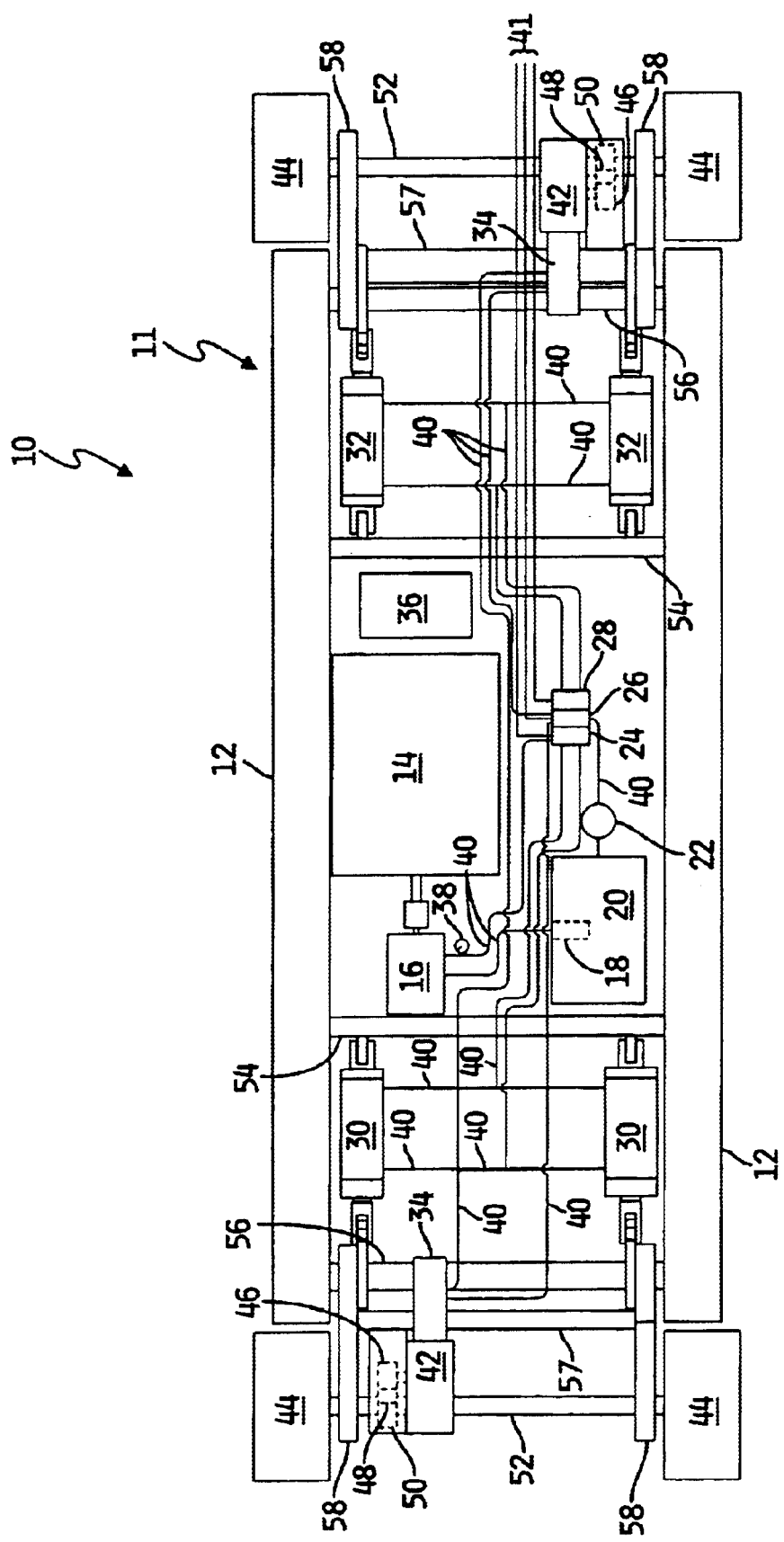
FIG. 1a is a top elevational view of a mobile home movement apparatus.

While the disclosure is susceptible to various modifications and alternative forms, specific embodiments thereof have been shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the appended claims.

Figure 1B:
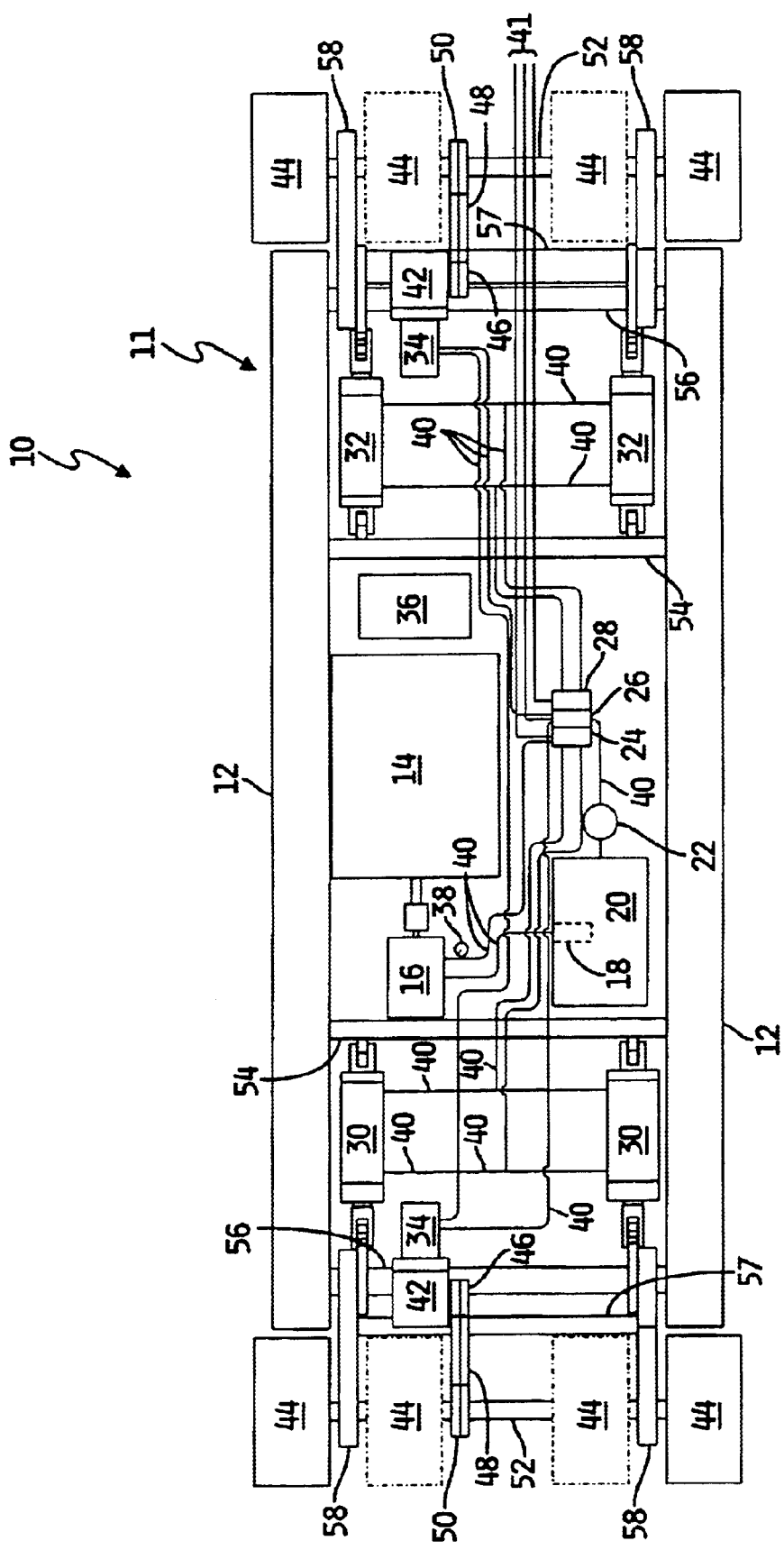

A mobile home transportation apparatus 10 is shown in FIG. 1. The apparatus includes a frame structure 11 containing a plurality of load-bearing frames 12, illustratively two load-bearing I-beams. A drive mechanism 14, for example, a gas engine, electric motor, electric actuator, etc., is coupled to the frame structure 11 by suitable mechanisms, such as bolts, screws, or clamps. Drive mechanism 14 is coupled to and provides power to a hydraulic pump 16 coupled to the frame structure 11. A battery 36 is coupled to the frame structure 11 and provides starting power to the drive mechanism 14. Pump 16 is coupled by one or more hydraulic lines 40 to a hydraulic fluid reservoir 20. Reservoir 20 provides hydraulic fluid to pump 16 through a hydraulic fluid strainer 18 coupled internally to reservoir 20. Pump 16 is further coupled to a plurality of hydraulic valves, illustratively a first side valve 24, a wheel propagation valve 26, and a second side valve 28. For example, valves 24, 26, and 28 can be dual solenoid, spring return to center with open center valves. In addition, for example, wheel propagation valve 26 can be mounted to a tandem circuit manifold. Valves 24, 26, 28 are coupled to reservoir 20 through a hydraulic fluid filter 22 by one or more hydraulic lines 40. Valve 24 is coupled to a plurality, illustratively two, first side hydraulic cylinders 30 by lines 40. Valve 26 is coupled to hydraulic wheel motors 34 by lines 40. Valve 28 is coupled to a plurality, illustratively two, second side hydraulic cylinders 32. Cylinders 30, 32 are operatively coupled to valves 24, 28, respectively, which as indicated above can be dual solenoid, spring return to center with open center valves which are mounted on parallel circuit manifolds. Hydraulic cylinders which can be utilized in apparatus 10 include a ten inch stroke cylinder with a two inch stop tube positioned therein so that the cylinders have an eight inch piston rod stroke. Having the stop tube positioned as described helps to alleviate side stress on the piston rod and improves the longevity of the rod seals. Electrical lines 41 control the activation of valves 24, 26, 28. Electrical lines 41 are coupled to a control center. The functions of valves 24, 26, 28 can be controlled by switches contained in the control center. Illustratively, the control center may be linked to a remote control box allowing control of valves 24, 26, 28 and apparatus 10 through wireless communication signals.

The first and second side hydraulic systems of apparatus 10 are similar in design. Only the first side will be described with the understanding that the second side is similar in function and design. First side hydraulic cylinders 30 have a first side coupled to a cylinder frame 54. Cylinder frame 54 is coupled transversely to frames 12. A second side of cylinders 30 is coupled to wheel struts 58. Wheel struts 58 couple to the wheel axle 52 and are coupled together by pivot axle 56. A plurality of wheels 44, illustratively four on each side of apparatus 10, are coupled together and to wheel struts 58 by wheel axle 52. Wheel axle 52 is also coupled to an axle drive sprocket 50. Sprocket 50 is coupled to gear box sprocket 46 by drive chain 48. Gear box sprocket 46 is coupled to gear box 42 which is coupled to wheel motors 34. Additionally, as shown in FIG. 1, a pressure gauge 38 is coupled to lines 40 and displays the pressure present in the respective lines.

Valve 26 controls wheel motors 34 by pumping hydraulic fluid through the motors 34. Wheel motors 34 powers the wheels 44 by driving the drive chain 48 through gear box 42. Gear box 42 provides power transformation through a worm drive having a gear ratio of for example a 10:1 reduction. Worm drives are known for their absolute non-movement unless power is supplied to the gear box. Accordingly, wheels 44 of apparatus 10 are inhibited from rotating unless power is supplied to gear box 42. Therefore, no braking mechanism is required for the wheels 44. Gear box 42 is coupled to sprocket 46 which provides torque to chain 48. Chain 48 in turn provides torque to sprocket 50. Torque applied to sprocket 50 causes the wheel axle 52 to rotate. Rotation of wheel axle 52 will cause the attached wheels 44 to rotate and move apparatus 10. Valve 26 controls the first and second side drive motors and, therefore, the wheels 44 of the first and second side rotate in the same direction at the same time during movement of apparatus 10.

Figure 2:
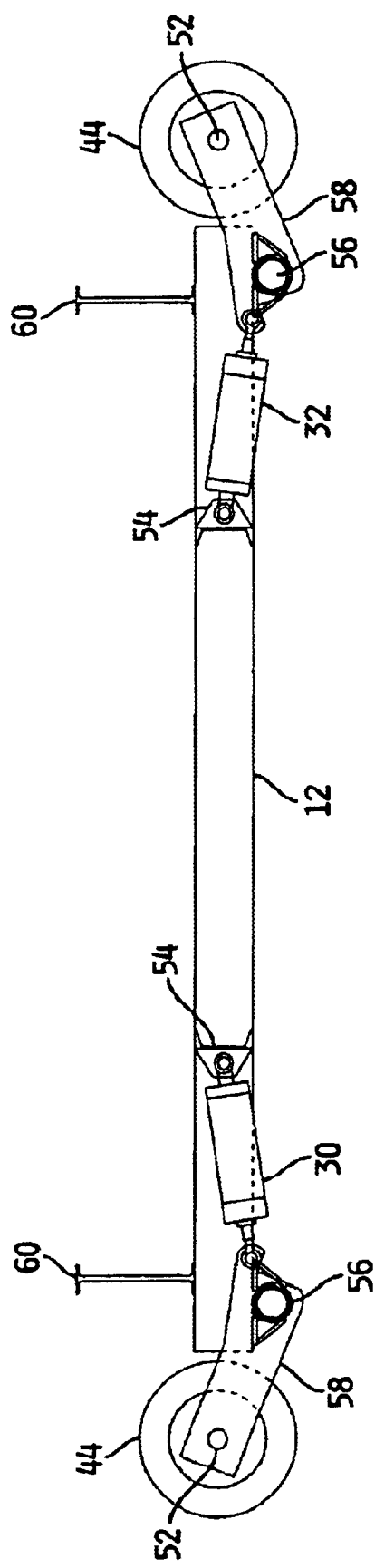
FIG. 2 is a fragmentary side view of the movement apparatus of FIG. 1 showing two hydraulic cylinders coupled separately to two movable wheels.
Figure 3A:
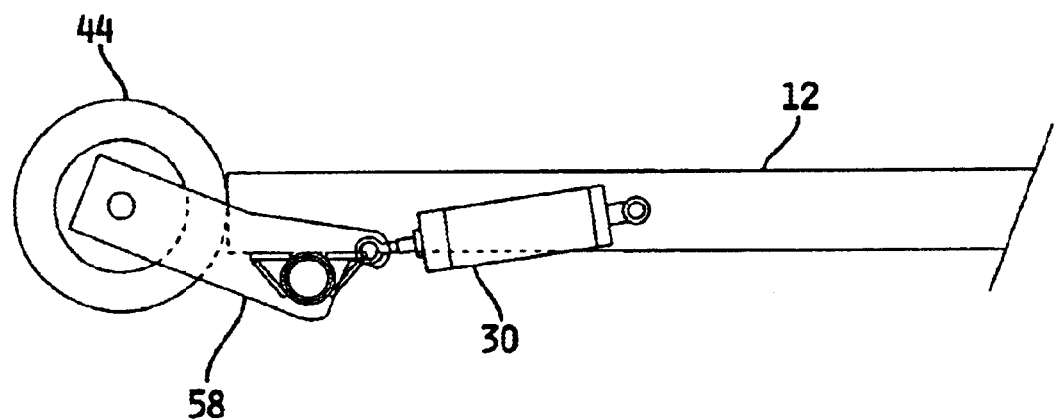
FIG. 3a is a fragmentary side view of one of movable wheels of FIG. 2 in a raised position.
Figure 3B:
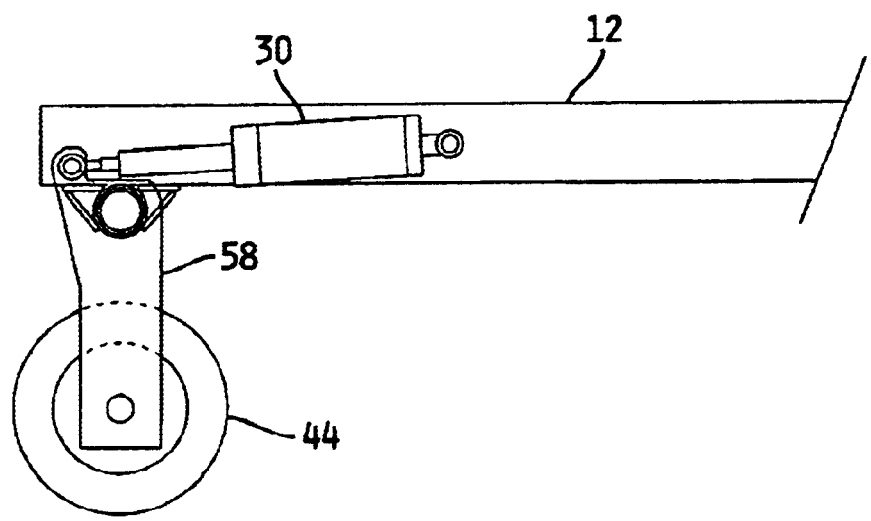
FIG. 3b is a fragmentary side view of one of the movable wheels of FIG. 2 in a lowered position.

Load-bearing frames 12 are designed to be transversely couplable to the I-beams 60 of a mobile home or mobile home trailer as shown in FIG. 2. The elevation of the I-beams 60 can be altered by the activation of the wheel struts 56 by cylinder 30. When cylinder 30 is contracted, wheel struts 56 rotate so that wheels 44 are raised to a transportation position as shown in FIG. 2 and FIG. 3*a*. When cylinder 32 is extended, wheel struts 56 rotate so that wheels 44 are lowered as shown in FIG. 3*b*. When wheels 44 are in a lowered position (as shown in FIG. 3*b*), wheels 44 contact the surface of the ground and can provide frictional movement of the apparatus 10 and the coupled mobile home or trailer I-beams 60. It should be understood that as struts 56 rotate to lower wheels 44 and contact the surface of the ground the wheels 44 are rotated at a speed which corresponds to the rate at which the struts 56 are lowered so as to allow the struts 56 to raise the load. It should also be understood that as struts 56 rotate to raise wheels 44 from the surface of the ground the wheels 44 rotate in an opposite direction at a speed which corresponds to the rate at which the struts 56 are raised. In other words, the speed at which the wheels 44 rotate is dependant upon the speed at which the struts 56 rotate. The speed of at which struts 56 rotate in relation to the speed at which the wheels 44 rotate is controlled by a flow control valve in fluid communication with valves 24, 26, and 28.

Figure 4:
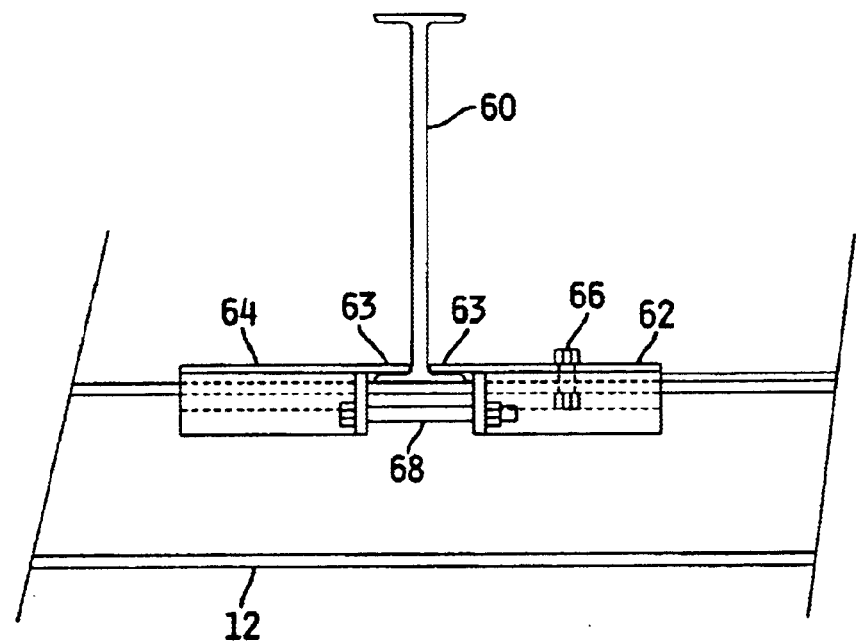
FIG. 4 is a rear perspective view of a clamp coupling the apparatus of FIG. 1 to an I-beam of a mobile home.
Figure 5:
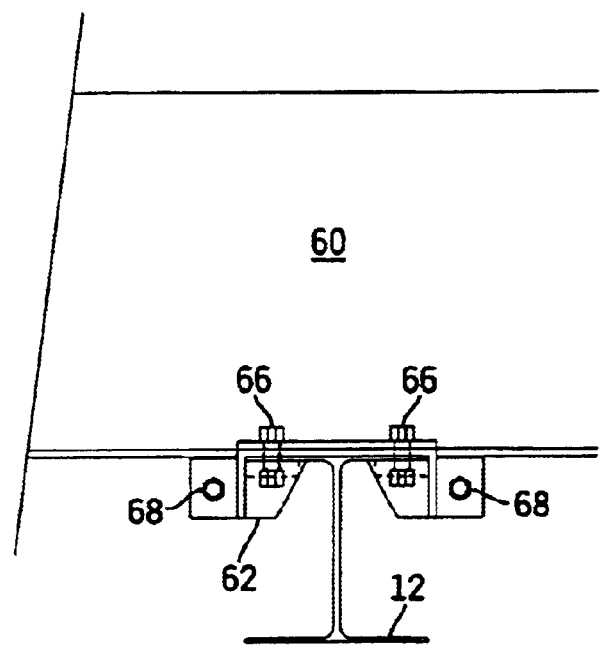
FIG. 5 is a side perspective view of the clamp of FIG. 4.

The I-beams 60 of a mobile home or trailer are couplable to the load-bearing frames 12 by one or more first clamps 62 and second clamps 64 as shown in FIG. 4 and FIG. 5. First and second clamps 62, 64 are coupled to the frame 12 of the apparatus 10 by suitable mechanisms, for example, vertical bolts 66. The clamps 62, 64 each have a lip 63 that work together to provide a horizontal force against the I-beam 60 and a vertical force against the I-beam 60 and the frame 12 thereby pressure coupling I-beam 60 to the frame 12. Clamp 62 and clamp 64 are further coupled together by horizontal bolts 68.

Figure 6A:
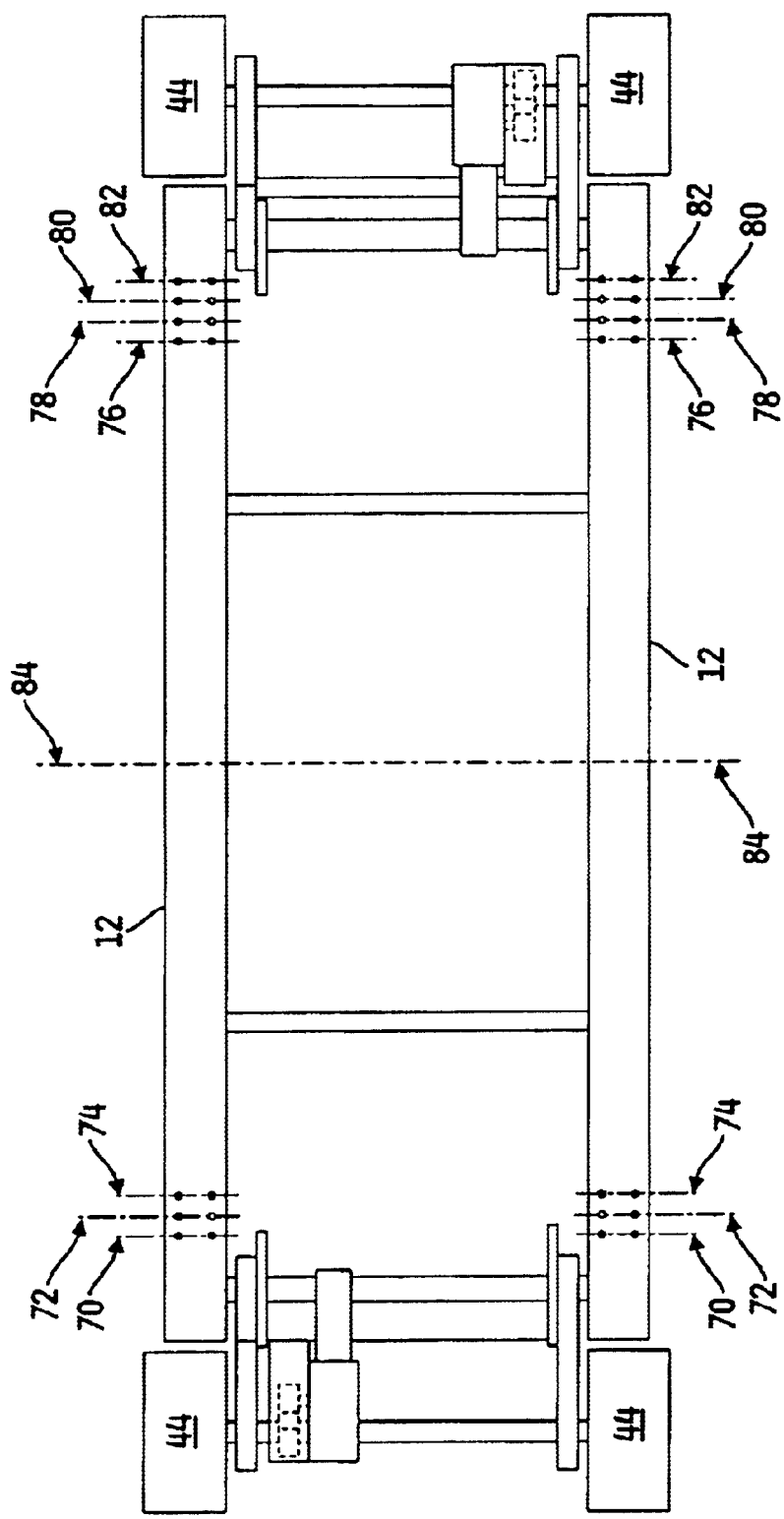
FIG. 6a is a top elevational view of the apparatus of FIG. 1a indicating possible coupling positions of the apparatus and the clamp of FIG. 4.
Figure 6B:
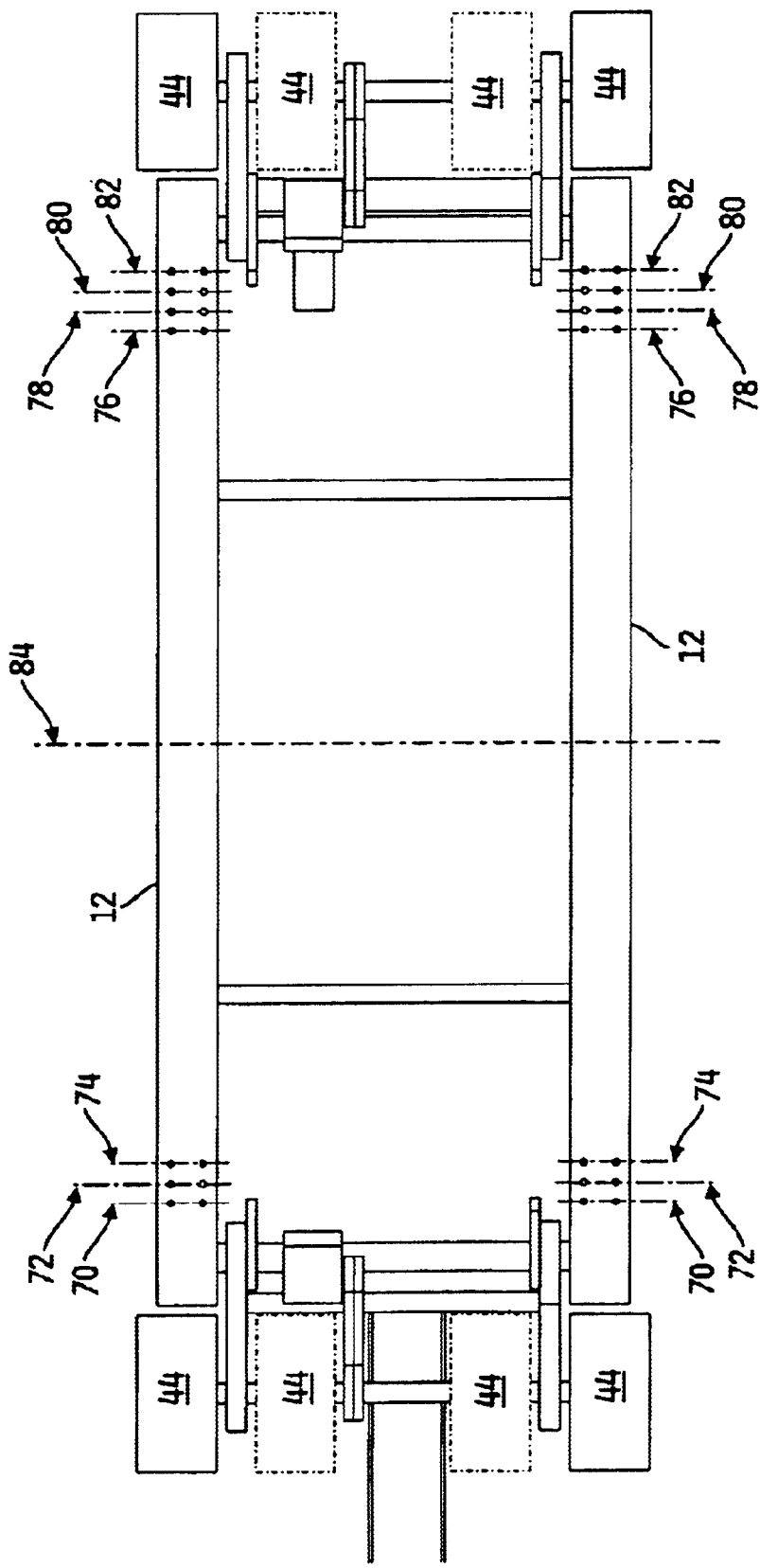
FIG. 6b is a top elevational view of the apparatus of FIG. 1b indicating possible coupling positions of the apparatus and the clamp of FIG. 4.

Mobile homes and trailers are manufactured by many different companies and have a variety of widths between their I-beams 60. To support the varied I-beam widths, apparatus 10 includes a plurality of machined bolt-locating holes 70–82 in the load-bearing frames 12 as shown in FIG. 6. The bolt-locating holes 70–82 are measured from an apparatus center line 84. Illustratively, the bolt-locating holes include a 106" locating hole 70, a 102" locating hole 72, a 98" locating hole 74, a 96" locating hole 76, a 100" locating hole 78, a 104" locating hole 80, and a 108" locating hole 82. Bolt-locating holes 70–82 allow apparatus 10 to adapt to various I-beam configurations present in mobile homes and trailers.

Figure 7:
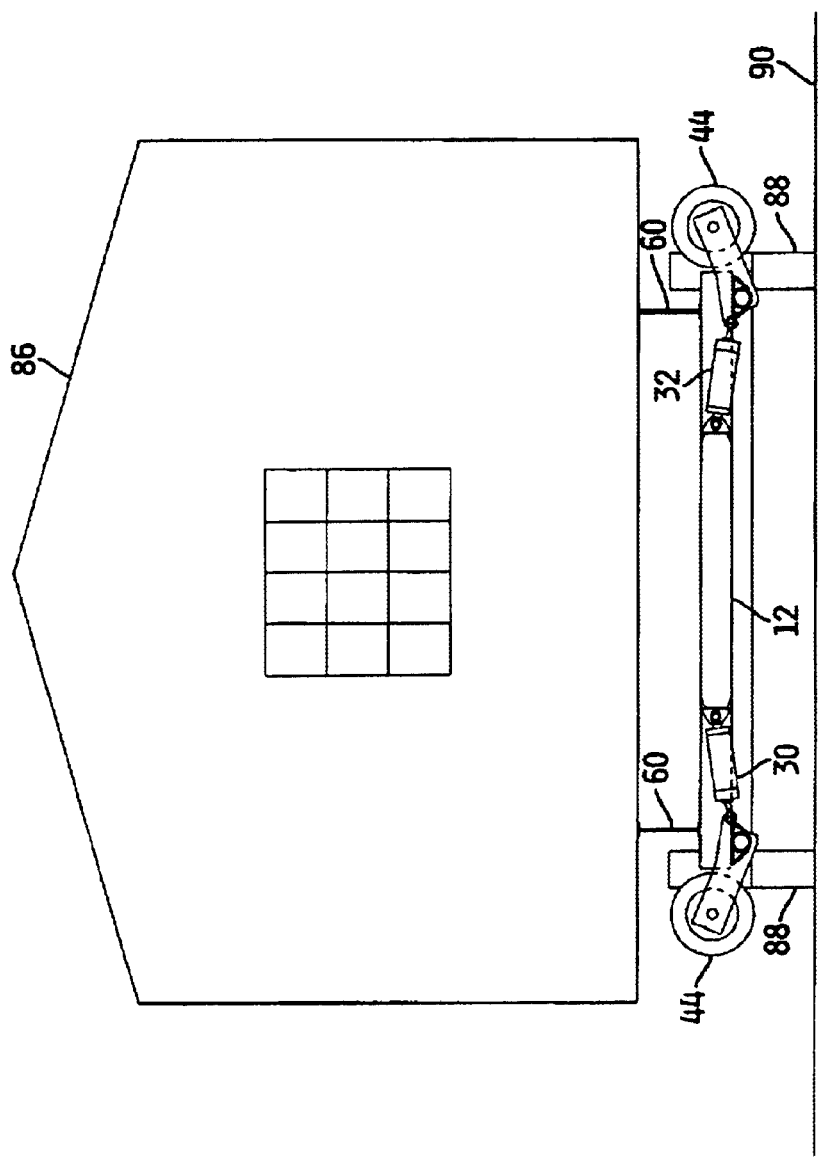
FIG. 7 is a rear perspective view of the apparatus of FIG. 1 coupled to the frame of a mobile home and having the movable wheels in a raised position.

FIG. 7 shows apparatus 10 coupled to the I-beams 60 of a mobile home 86. Alternatively, apparatus 10 may be coupled to the I-beams 60 of a trailer upon which the mobile home 86 is coupled. The mobile home 86 includes a plurality of mobile home transportation wheels 88 that elevate the mobile home 86 to a first elevation above the ground plane 90. The cylinders 30, 32 of apparatus 10 are in a retracted position raising the wheels 44 off of the ground plane 90 and allowing transportation wheels 88 to contact the ground plane 90. In this configuration, apparatus 10 is ready for the mobile home 86 to be transported by a tractor or vehicle.

Figure 8:
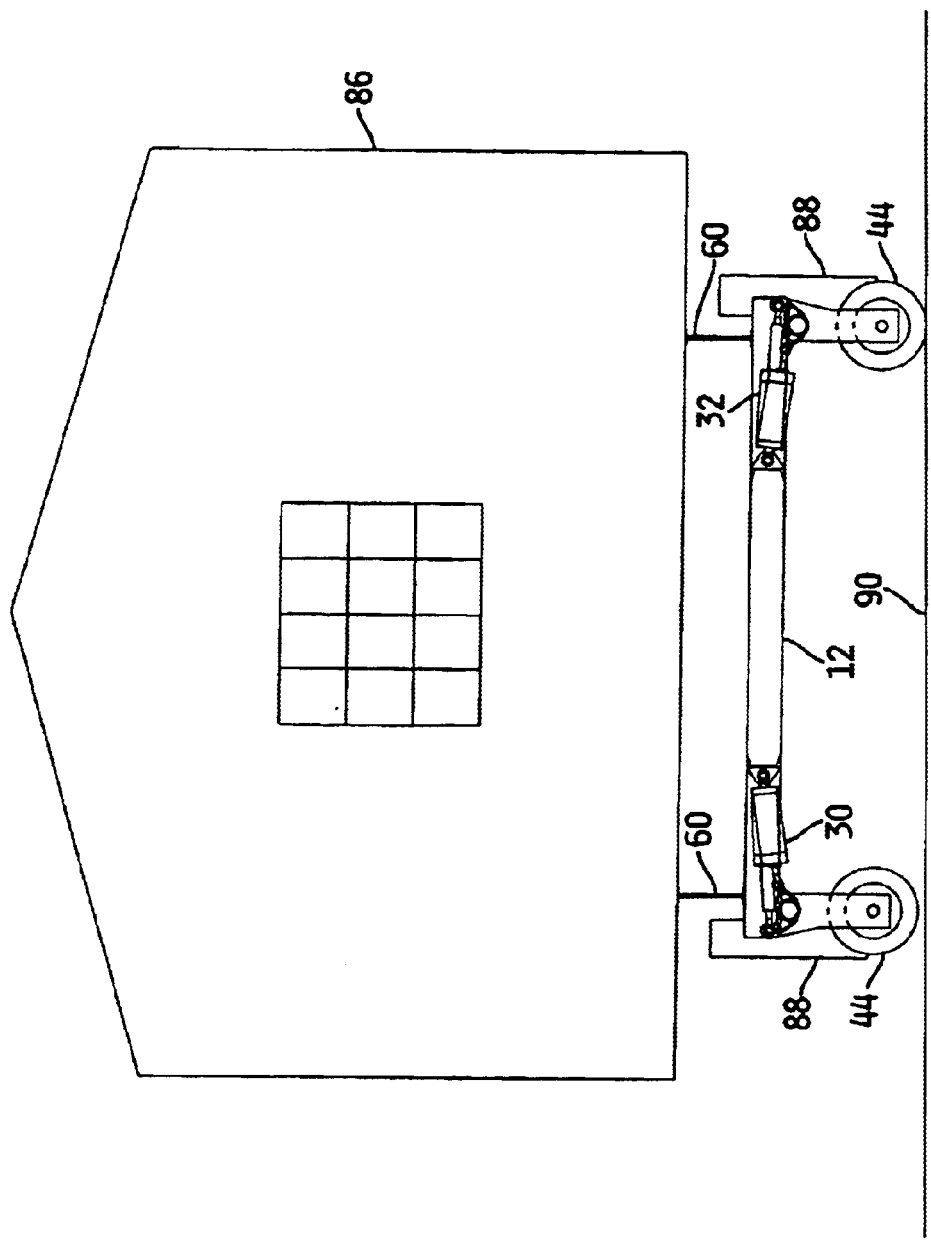
FIG. 8 is a rear perspective view of the apparatus of FIG. 1 coupled to the frame of a mobile home and having the movable wheels in a lowered position.

When movement of the mobile home 86 is desired, cylinders 30, 32 are extended, by means mentioned above, and rotate the wheels 44 to a lowered position as shown in FIG. 8. When the wheels 44 of apparatus 10 are in the lowered position, apparatus 10 forces the I-beams 60 and the coupled mobile home 86 to raise from the first elevation to a second elevation thereby lifting the transportation wheels 88 from ground plane 90. The rear end of the mobile home 86 that is coupled to apparatus 10 may be moved in a circumferential direction around the front end of the mobile home 86. It should be appreciated that while the mobile home is being raised to a second elevation hydraulic fluid is directed to the flow control which, in turn, directs to the hydraulic fluid to the wheel motor 34 and to cylinders 30, 32. It should also be appreciated that when the wheels 44 are in a lowered position and there is no load positioned on apparatus 10, a solenoid valve located upstream from the flow control valve diverts the hydraulic fluid only to the wheel motors 34 so as to increase wheels 44 rate of rotation about five fold relative to when the wheels are rotated when a load is positioned on the apparatus 10 (e.g. when a mobile home is positioned on apparatus 10). When the hydraulic fluid is diverted only to the wheel motors 34, apparatus 10 is able to move at about, for example, 25 foot per minute. (Note that this results in a no load speed of about, for example, 25 foot per minute and load speed of about, for example, 5 foot per minute.) Additionally, raising mobile home 86 to the second elevation and lifting the transportation wheels 88 from the ground plane 90 facilitates the changing of damaged or blown transportation wheels 88.

Figure 9:
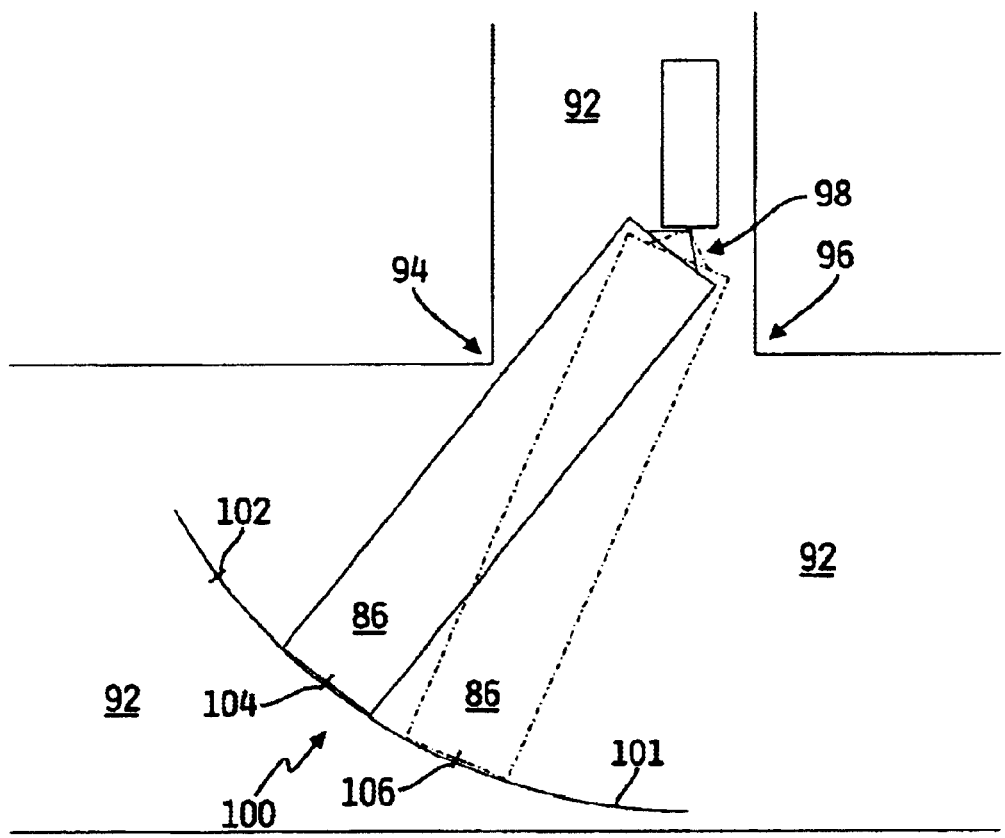
FIG. 9 is top perspective view displaying a mobile home being repositioned by the apparatus of claim 1.

Moving the rear end of mobile home 86 circumferentially around the front end of mobile home 86 provides an improvement in the maneuvering capabilities of the mobile home during transportation as depicted in FIG. 9. Mobile home 86 is being transported along a road 92. During the transportation of mobile home 86 multiple left and right-hand turns may be required. Turns having a sharp 90° turn or more are difficult because the length of the mobile home causes the rear end 100 of the mobile home to follow a shorter path than the towing vehicle and can result in collisions to obstacles, for example obstacles 94 and 96 positioned at the corners of the road 92. These difficult turns can be completed in an easier fashion by stopping the towing vehicle at a first position 104 in the turn. Apparatus 10 is then powered and cylinders 30, 32 rotate the wheels 44 to the lowered position thereby raising the rear end 100 of the mobile home 86. Transportation wheels 88 will break contact with the road 92 when the rear end 100 of mobile home 86 is raised. The wheel motors 34 are then engaged to turn the wheels 44 and thereby move apparatus 10 and the coupled mobile home 86. Apparatus 10 moves along a circumferential arc 101 in a direction 102 about the front end 98 of mobile home 86. The apparatus 10 will move the rear end 100 of the mobile home 86 from a first position 104 along arc 101 to a second position 106. The cylinders 30, 32 are powered again to rotate the wheels 44 to a raised position thereby lowering the rear end 100 of mobile home 86 and bringing transportation wheels 88 back in contact with the road 92. The towing vehicle has now completed the turn and can continue on to its destination. Maneuvering around some turns or obstacles may require a series combination of lowering the apparatus wheels 44, engaging apparatus 10 to move the rear end 100 of mobile home 86 along arc 101, raising wheels 44, maneuvering the towing vehicle and mobile home to a new position, and repeating the relocation of the rear end 100 by apparatus 10. Additionally, apparatus 10 may be used to maneuver the mobile home into its appropriate site at its final destination. This process may require the use of apparatus on the rear end 100 as well as on the front end 98 of the mobile home 86. Apparatus 10 can be coupled and decoupled form the mobile home 86 ends 98,100 to facilitate the detailed maneuvering at the final location site.

Figure 10:
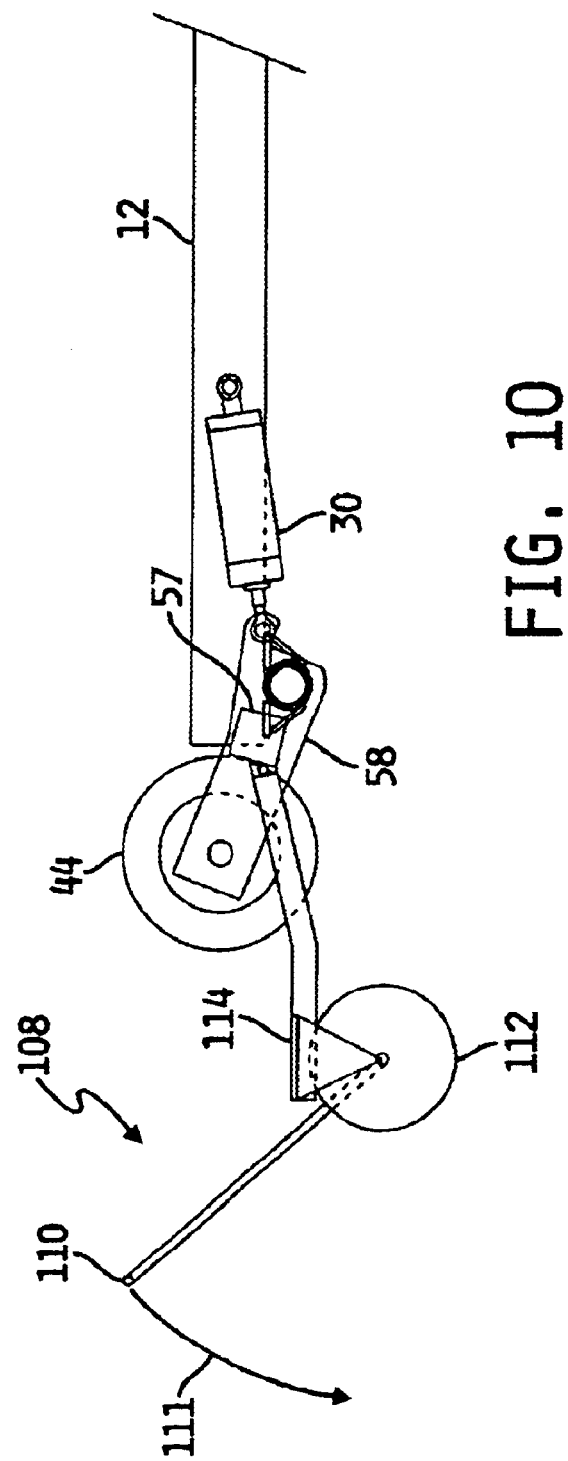
FIG. 10 is a side perspective view of a placement dolly attached to the apparatus of FIG. 1.
Figure 11:
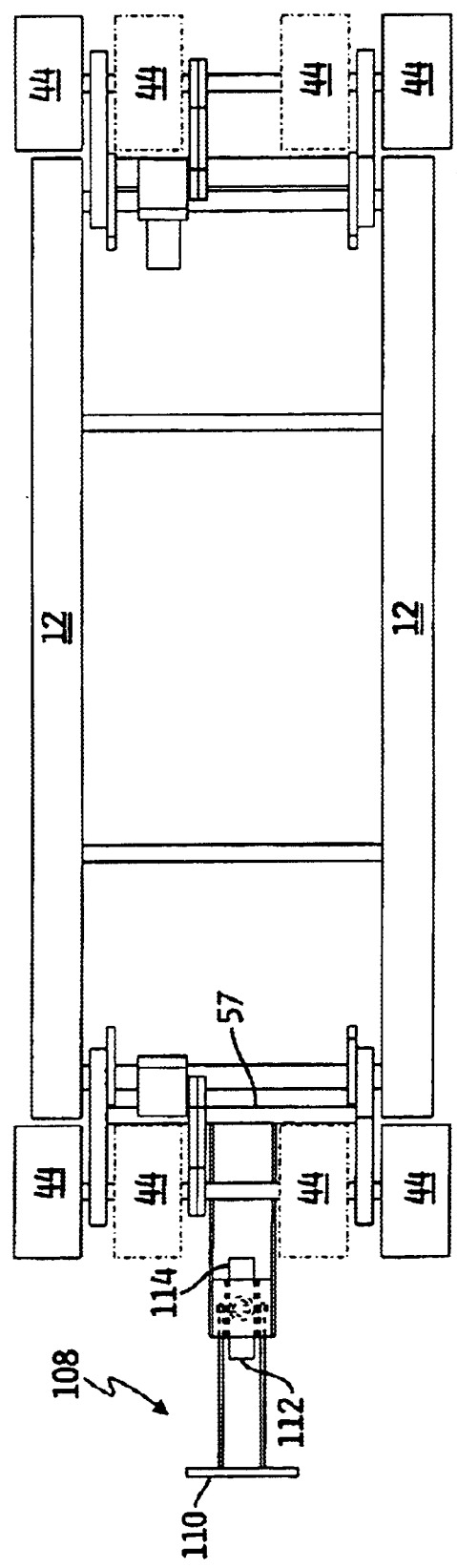
FIG. 11 is a top perspective view of the placement dolly of FIG. 10 attached to the apparatus of FIG. 1.
Figure 13A:
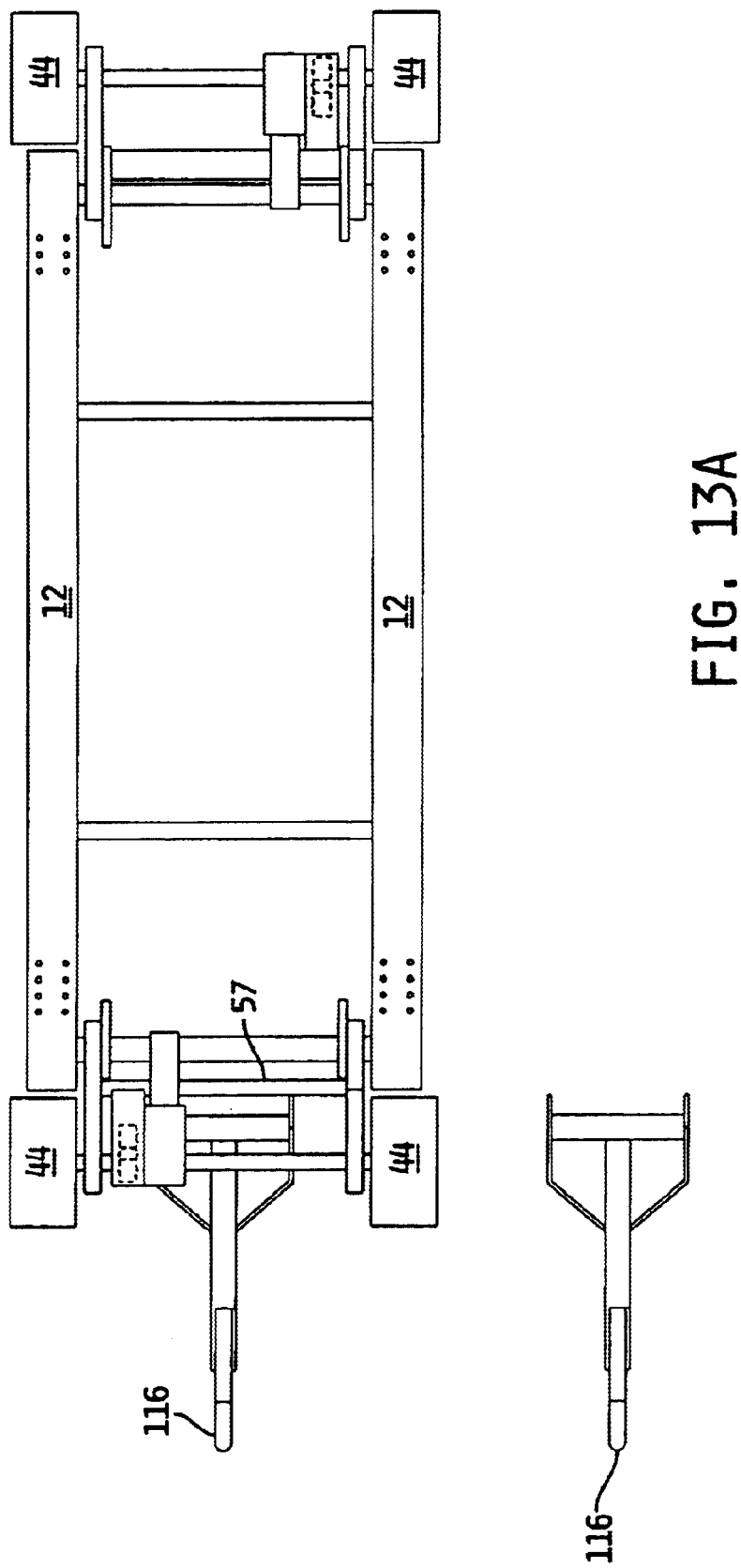
FIG. 13a is a top perspective view of the ball hitch assembly of FIG. 12a attached to the apparatus of FIG. 1.
Figure 13B:
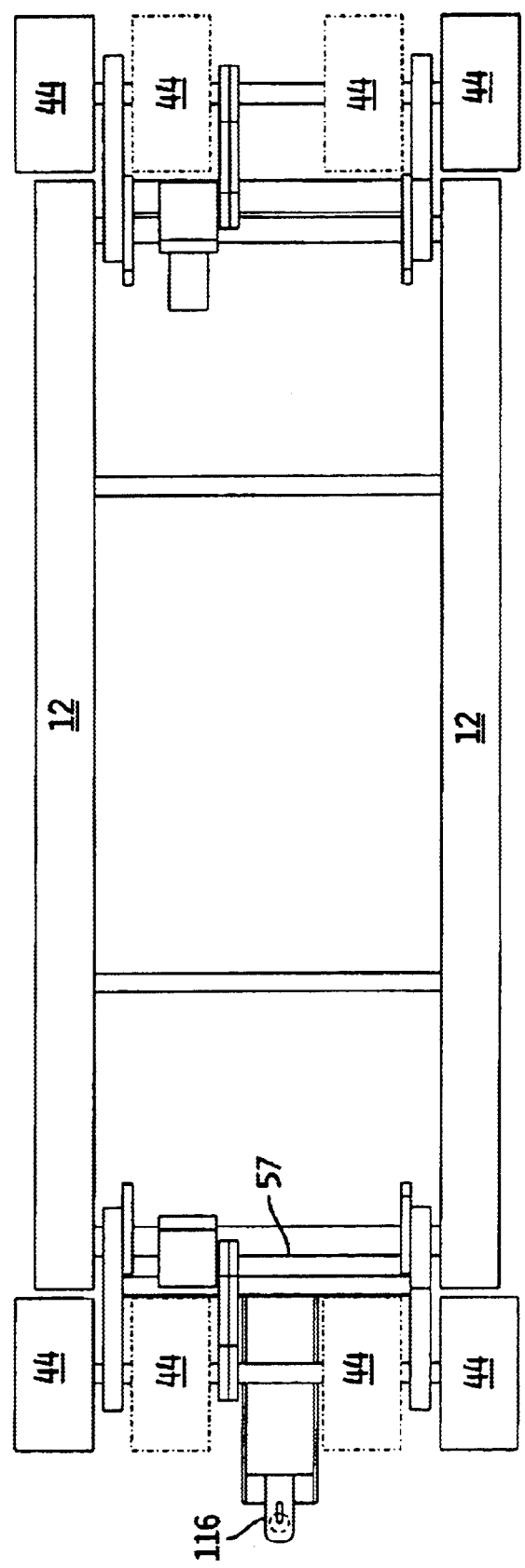
FIG. 13b is a top perspective view of the ball hitch assembly of FIG. 12b attached to the apparatus of FIG. 1.

During the coupling and decoupling of the apparatus 10 to the mobile home or trailer I-beams 60, a placement dolly 108 can maneuver apparatus 10 manually. Placement dolly 108 includes a detachable steering handle 110, a swivel wheel 112, and a dolly attachment frame 114 as shown in FIG. 10 and FIG. 11. The attachment frame 114 is coupled to transport frame 57, which transversely couples the load-bearing frames 12 of apparatus 10. Attachment frame 114 is secured to transport frame 57 by a plurality of slip pins. By applying force in a downwardly direction 111, the elevation of apparatus 10 can be controlled and matched to the elevation of the I-beams 60 of the mobile home or trailer. By pushing or pulling handle 110, the swivel wheel 112 can be engaged to manually move and position apparatus 10. The swivel wheel 112 can rotate in a 35° arc in relation to the attachment frame and provides increased maneuverability of apparatus 10 when positioning apparatus 10 under the I-beams of a mobile home or trailer.

Figure 15A:
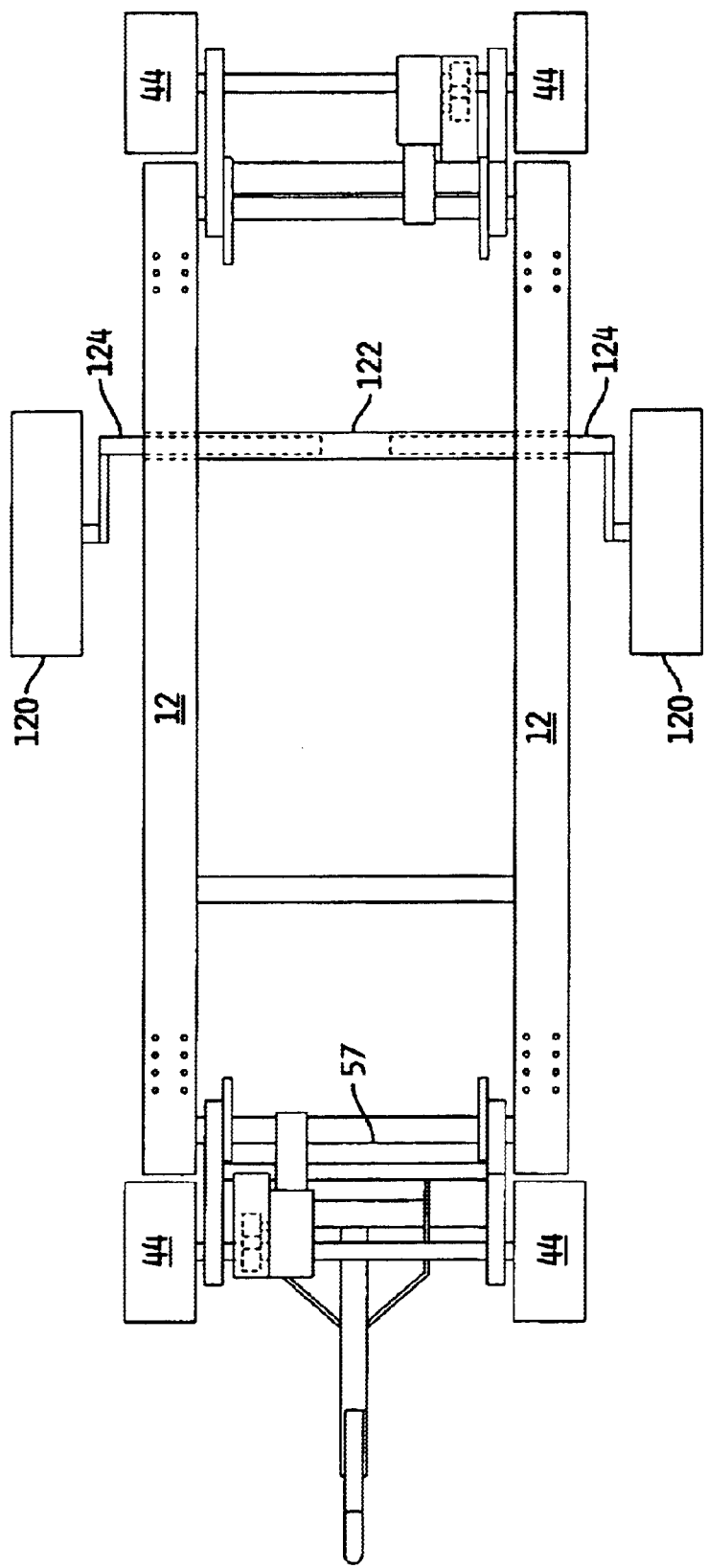
FIG. 15a is a top perspective view of the transport dolly of FIG. 14a attached to the apparatus of FIG. 1.
Figure 15B:
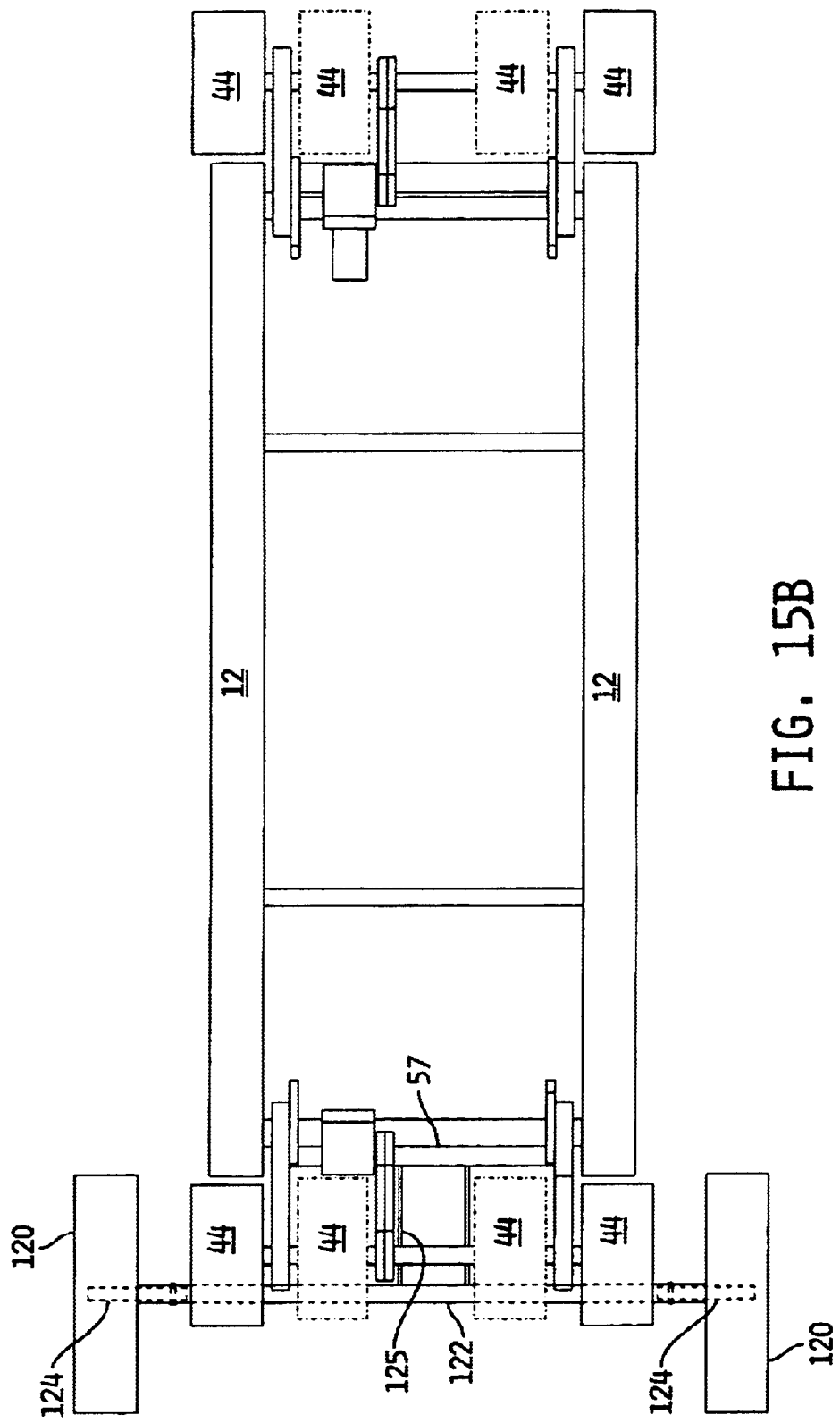
FIG. 15b is a top perspective view of the transport dolly of FIG. 14b attached to the apparatus of FIG. 1.
Figure 16A:
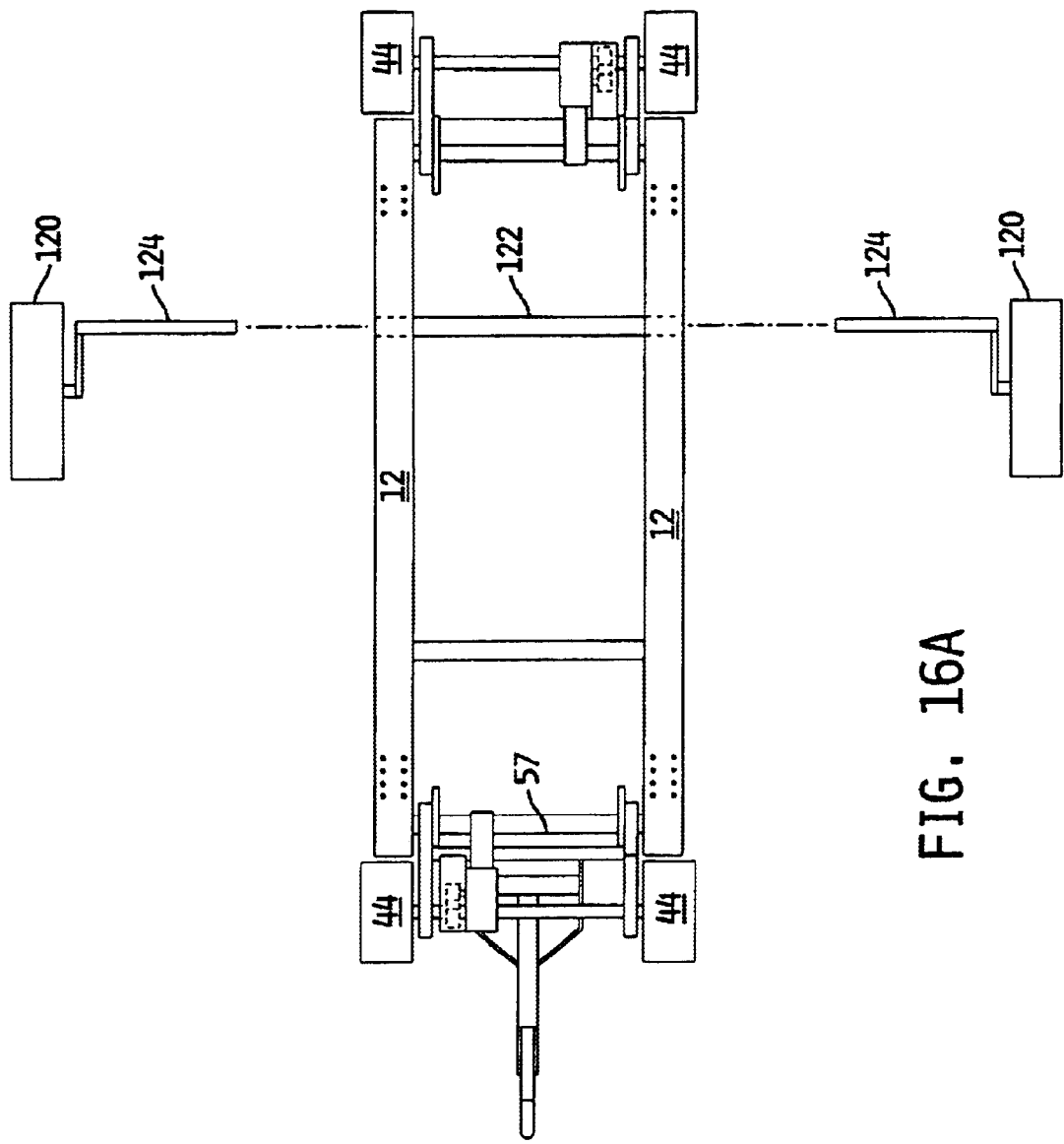
FIG. 16a is a side perspective view of the transport dolly of FIG. 14a having the dolly wheels decoupled from the apparatus of FIG. 1.
Figure 16B:
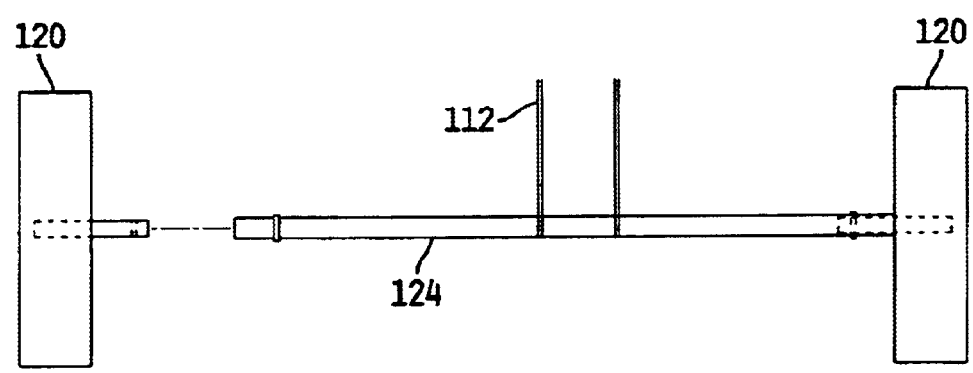
FIG. 16b is a side perspective view of the transport dolly of FIG. 14b having the dolly wheels decoupled from the apparatus of FIG. 1.

A ball hitch assembly 116 may be coupled to apparatus 10 to allow apparatus 10 to be transported by a vehicle or tractor as shown in FIGS. 12a, 12b, 13a, and 13b. The ball hitch 116 is fixedly coupled to the transport frame 57 of apparatus 10. Coupling the ball hitch 116 to a vehicle or tractor causes the first side of apparatus 10 to elevate in relation to the second side. A transport dolly 118 can then be coupled to the second side of apparatus 10 as shown in FIGS. 14a, 14b, 15a, and 15b. Transport dolly 118 includes a pair of transport dolly wheels 120 each coupled to a transport dolly frame 124. The transport dolly frames 124 are each coupled to a transport dolly axle 122. In some embodiments, transport dolly axle 122 may be coupled to a central portion of apparatus 10 as shown in FIG. 14a and FIG. 15a. In other embodiments, dolly axle 122 may be coupled to a transport frame 57 of apparatus 10 by a coupling member 125 as shown in FIG. 14b and FIG. 15b. The transport dolly frames 124 are secured to the dolly axle 122 by a plurality of slip pins. The dolly wheels 120 have a greater diameter than wheels 44 and elevate apparatus 10 to a level at which the wheels 44 and the frame structure 11 are not in contact with the ground. In this configuration, the second end of apparatus 10 is elevated by dolly wheels 120 and the front end of apparatus 10 is elevated by the ball hitch 116. This configuration of apparatus 10 allows apparatus 10 to be transported to differing locations by a vehicle. Once apparatus 10 is delivered to the desired location, the dolly wheels 120 can be separated from the transport dolly axle 122 by sliding the dolly wheels 120 out away from apparatus 10, as shown in FIG. 16a and FIG. 16b. The dolly wheels 120 can be uncoupled from apparatus 10 without uncoupling the transport dolly frame 188 from the transport frame 57 of apparatus 10. Apparatus 10 can be readied for transportation or coupling to the I-beams 60 of a mobile home or trailer by coupling or de-coupling the dolly wheels 120 from the dolly axle 122 which may be fixedly coupled to the transport frame 57 by members 125 or transversely coupled across frames 12 of apparatus 10.

Figure 17:
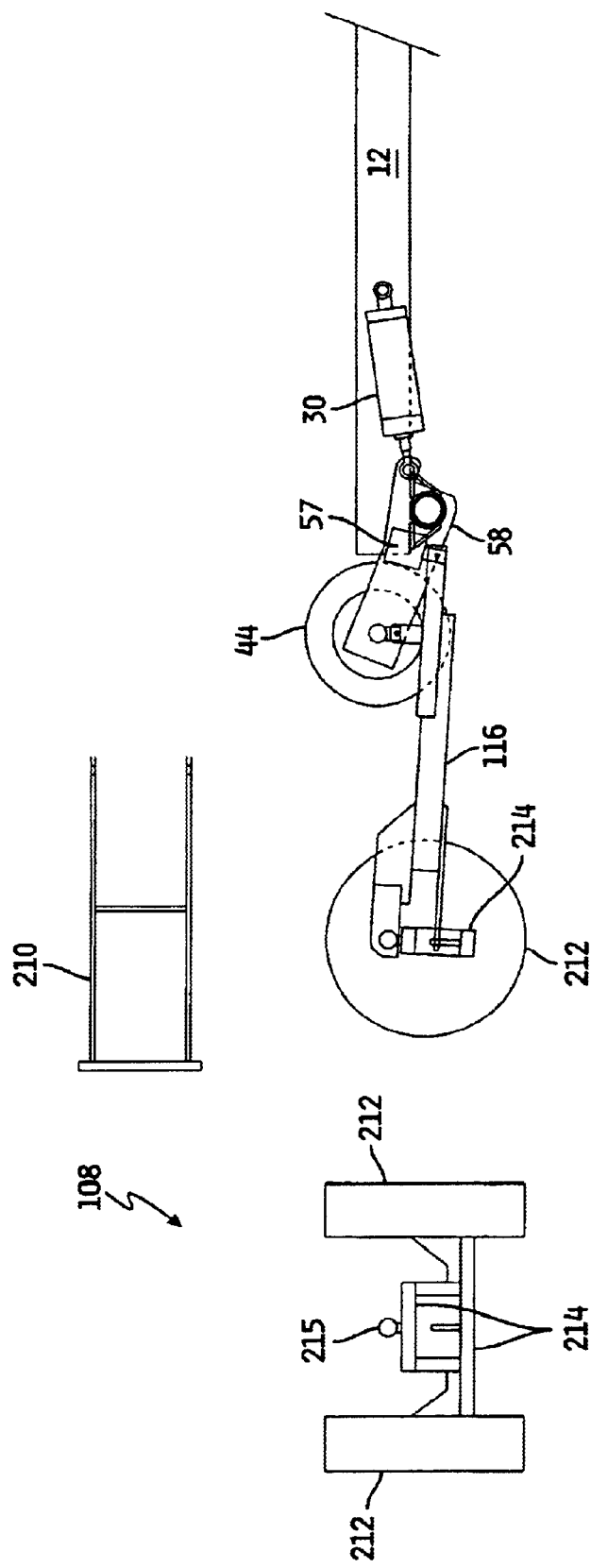
FIG. 17 is a perspective view of another embodiment of a placement dolly attached to the apparatus of FIG. 1.
Figure 18:
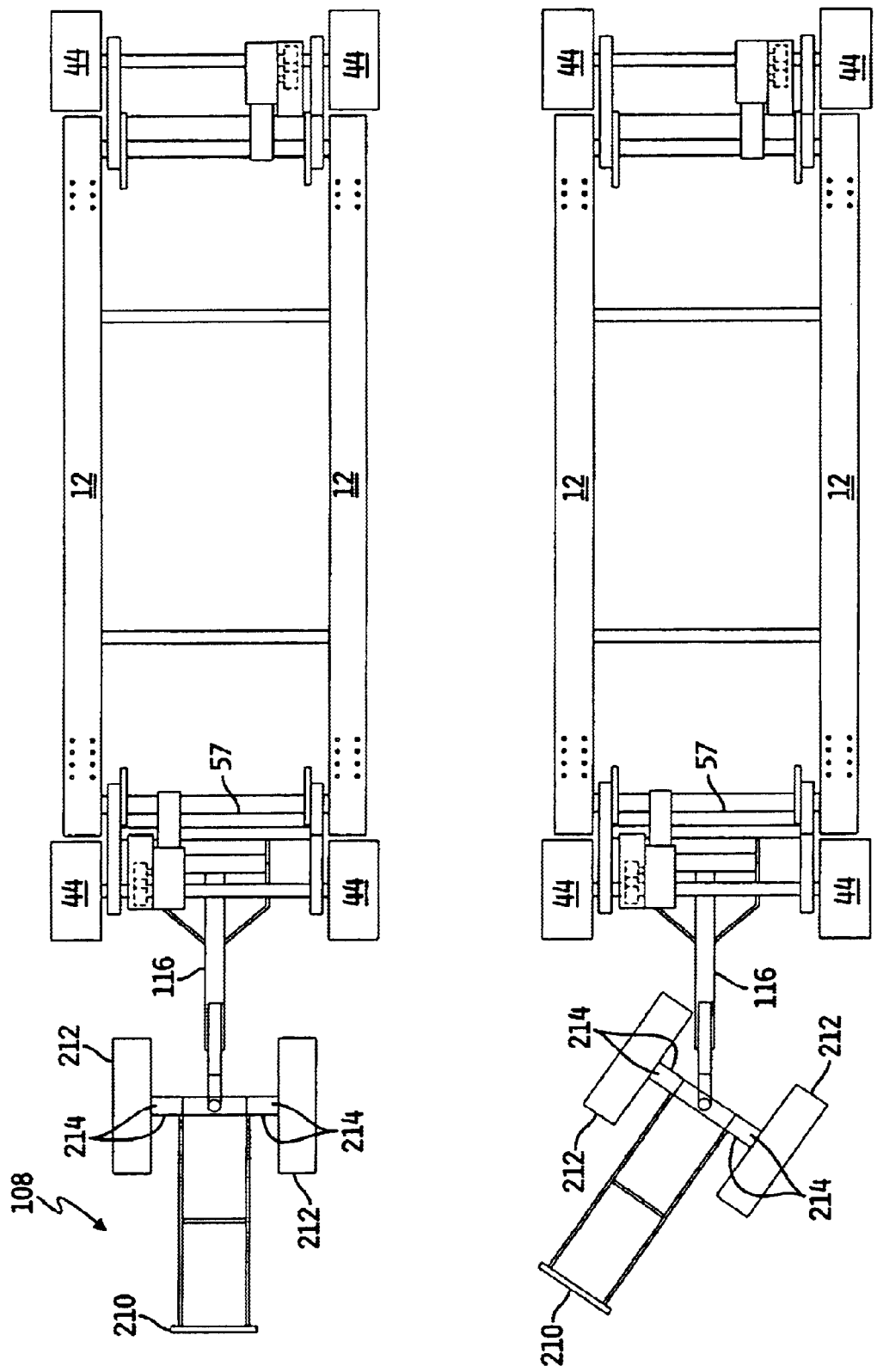
FIG. 18 is an elevated perspective view of the placement dolly of FIG. 17.

In another embodiment, placement dolly 108 includes a detachable steering handle 210, dolly wheels 212, and dolly attachment frame 214 as shown in FIG. 17. Dolly attachment frame 214 includes a ball assembly 215. The attachment frame 214 is coupled to ball hitch assembly 116 by coupling ball assembly 215 to ball hitch assembly 116. Coupling attachment frame 214 to ball hitch assembly 116 causes apparatus 10 to raise in elevation relative to the ground providing an increased maneuverability of apparatus 10 during the positioning of apparatus 10. In particular, as shown in FIG. 18, apparatus 10 can be maneuvered by applying a force to handle 210 including turning apparatus in a 35° arc.

There are a plurality of advantages of the concepts of the present disclosure arising from the various features of the apparatus and methods described herein. It will be noted that alternative embodiments of the apparatus and methods of the present disclosure may not include all the features described yet still benefit from at least some of the advantages of such features. Those of ordinary skill in the art may readily devise their own implementations of the apparatus and methods of the present disclosure that incorporate one or more of the features of the present disclosure and fall within the spirit and scope of the invention defined by the appended claims.

What is claimed is:

1. An apparatus for moving a load, the apparatus comprising:
    a frame couplable to the load;
    a first and second wheel coupled to the frame and movable relative to the frame between a raised and lowered position; and
    a drive mechanism secured to the frame, the drive mechanism operably coupled to the first and second wheel (i) to rotate the first and second wheel to move the load and (ii) to separately move the first and second wheel relative to the frame between the raised and lowered position.

2. The apparatus of claim 1, wherein the frame is couplable to a frame of a mobile home.

3. The apparatus of claim 1, wherein the drive mechanism is controlled by a remote control device.

4. The apparatus of claim 1, wherein the wheels when in the lowered position alter the elevation of the apparatus relative to the raised position.

5. The apparatus of claim 1, wherein the frame is couplable to a dolly allowing the dolly to move the apparatus from a first location to a second location.

6. The apparatus of claim 1, wherein the frame is couplable to a ball hitch frame allowing the apparatus to be transported by a vehicle.

7. The apparatus of claim 1, wherein the frame is couplable to a plurality of transport wheels, the wheels elevating the apparatus from the ground.

8. An apparatus for moving a mobile home, the apparatus comprising:
    a frame configured to be couplable to the mobile home;
    a wheel coupled to the frame and movable relative to the frame between a first and second position; and
    a drive mechanism operably coupled to the frame, and mechanically coupled to the wheel, wherein the drive mechanism is configured to rotate the wheel and to move the wheel relative to the frame between the first and second position.

9. The apparatus of claim 8, wherein the apparatus moves a first end of the mobile home circumferentially around a second end of the mobile home.

10. The apparatus of claim 8, wherein the drive mechanism is controlled by a remote control device.

11. The apparatus of claim 8, wherein the wheel when in the second position changes the elevation of the apparatus relative to the first position.

12. The apparatus of claim 8, wherein the frame is couplable to a dolly allowing the dolly to move the apparatus from a first location to a second location.

13. The apparatus of claim 8, wherein the frame is couplable to a ball hitch frame allowing the apparatus to be transported by a vehicle.

14. The apparatus of claim 8, wherein the frame is couplable to a plurality of transport wheels, the wheels elevating the apparatus from the ground.

15. An apparatus for moving a load from a first position to a second position, comprising:
- a frame couplable to the load;
- a drive mechanism mounted to the frame;
- a plurality of movable wheels coupled to the frame;
- a plurality of drive motors coupled to the frame and controlling the movable wheels;
- a hydraulic system coupled to the frame, receiving power from the drive mechanism, and separately controlling the elevation of the wheels.

16. An apparatus for moving a load, comprising:
- a frame;
- a drive mechanism mechanically coupled to said frame;
- a strut (i) mechanically coupled to said frame such that said strut is movable relative to said frame between a first position and a second position; and (ii) operatively coupled to said drive mechanism such that said drive mechanism moves said strut between said first position and said second position; and
- a wheel (i) rotatably coupled to said strut, and (ii) operatively coupled to said drive mechanism such that said drive mechanism rotates said wheel relative to said strut.

17. The apparatus of claim 16, wherein the drive mechanism is configured to move said strut between said first position and said second position and contemporaneously rotate said wheel relative to said strut.

18. A method for moving a load, comprising:
- coupling said load to a frame;
- raising said load from a first elevation to a second elevation by lowering a wheel mechanism mechanically coupled to said frame;
- engaging said wheel mechanism with a drive mechanism such that a wheel coupled to said wheel mechanism rotates and causes said load to move from a first position to a second position; and
- lowering said load from said second elevation to said first elevation by raising said wheel mechanism.

* * * * *